W. JOHNSTON.
Thill-Coupling.

No. 197,221.              Patented Nov. 20, 1877.

Attest:
George Clark
Amos Holgate

Inventor:
William Johnston

UNITED STATES PATENT OFFICE.

WILLIAM JOHNSTON, OF MARINETTE, WISCONSIN.

IMPROVEMENT IN THILL-COUPLINGS.

Specification forming part of Letters Patent No. 197,221, dated November 20, 1877; application filed July 17, 1877.

*To all whom it may concern:*

Be it known that I, WILLIAM JOHNSTON, of Marinette, county of Oconto, and State of Wisconsin, have invented a new and useful Improvement in Shaft and Pole Couplings for Carriages, which improvement is fully set forth in the following specification, reference being had to the accompanying drawings.

The object of my invention is to construct couplings that are easily and more substantially fixed upon the axles, rapidly attached and detached to the carriage shafts or pole, at the same time securing cheapness of construction and application, with great strength and general utility.

Figure 1:
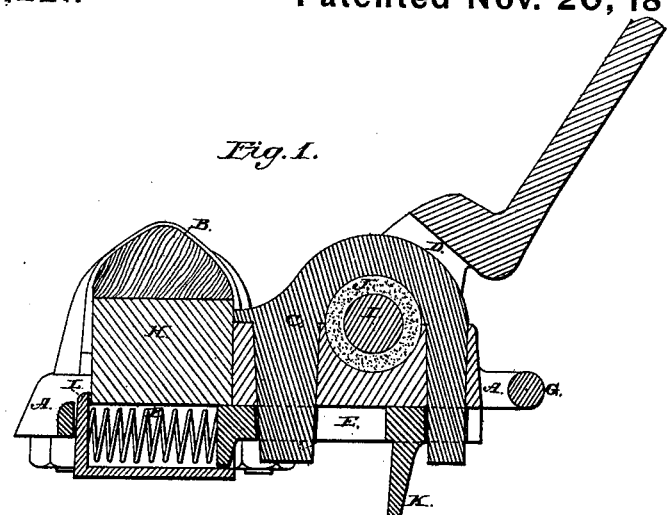
Figure 2:
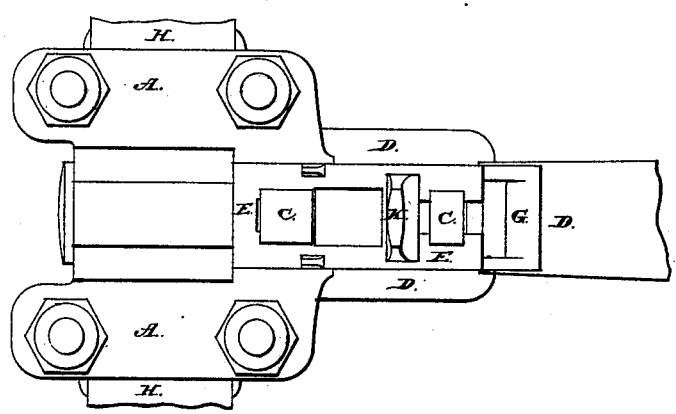
Figure 3:
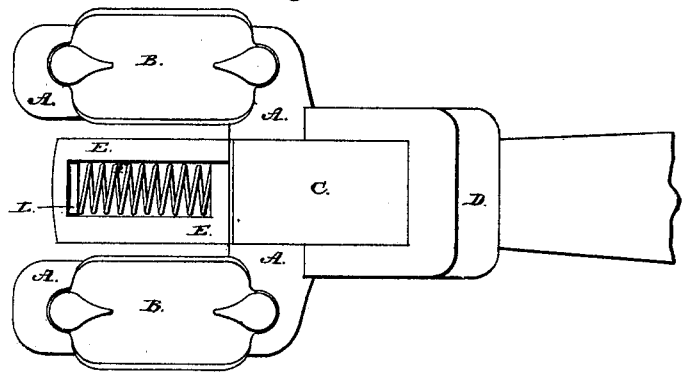

In the accompanying drawing, Figure 1 represents a longitudinal section through the center. Fig. 2 is a view of the under side; and Fig. 3, a plan, with the axle removed.

H represents axle; A, base-plate, provided with recesses for spring and cap, also holes for the clips; B B, two ordinary clips attaching base-plate to the axle; C, the coupling-cap, passing over the draw-iron pin of shafts and through the base-plate. It is provided with rabbets to receive the slide E. D, the draw-iron, attached to shafts, provided with pin I, which is covered with india-rubber J. E is the slide, with holes and slots constructed to receive the cap and spring, with thumb-piece K attached. F represents the spring passed into the recess of base, one end operating against the base and the other upon a projecting piece of slide. G is an eye made to receive one end of the safety-strap; I, the pin of draw-iron; J, a piece of rubber expressly made for this purpose, split and passed over pin.

The coupling, in all its parts, except the spring, will be made of the best malleable-iron, the draw-iron and pin of Norway iron, and the spring of either steel or brass. The clips and nuts are the same as are often used at present.

The method of attaching couplings to axles and the shafts to couplings is as follows: Put the slide into its place through the slot provided for it, and over the projection L insert the spring; bring it under the axle, (the exact position is found by the recess provided,) pass the bolt ends of clips through the holes of coupling, screw up by aid of nuts and wrench. The slide is forced back by means of the thumb-piece K; the ends of cap C resting upon pin of draw-iron are inserted through holes provided in base and slide; the slide being allowed to spring forward with a little pressure completes the attachment.

The operation is easy. By means of the two clips and a broad base-plate the general wear, and consequent shifting upon the axle, is avoided, the shipping and unshipping of the shaft or pole are rapid and effectual; the spring is entirely closed and kept in place by the axle, preventing any accumulation of dirt.

The rubber confined between the pin and coupling is so perfect as to prevent any material expansion, at the same time allowing free, noiseless action, with considerable less wear and tear.

I claim as my invention—

1. The thill-iron and clip having a spring-acted slide, in combination with a cap, which holds the iron in place, and whose ends engage with the slide, all constructed and arranged as described.

2. The combination of the base-plate A with the two clips B B, the coupling-cap C, in combination with draw-iron D, the slide E, the spring F, and the eye G, for receiving the safety-strap, constructed and operating as and for the purpose set forth.

WILLIAM JOHNSTON.

Witnesses:
GEORGE CLARK,
AMOS HOLGATE.